E. J. BERG.
VOLTAGE REGULATOR.
APPLICATION FILED MAY 12, 1908.
916,982.
Patented Apr. 6, 1909.
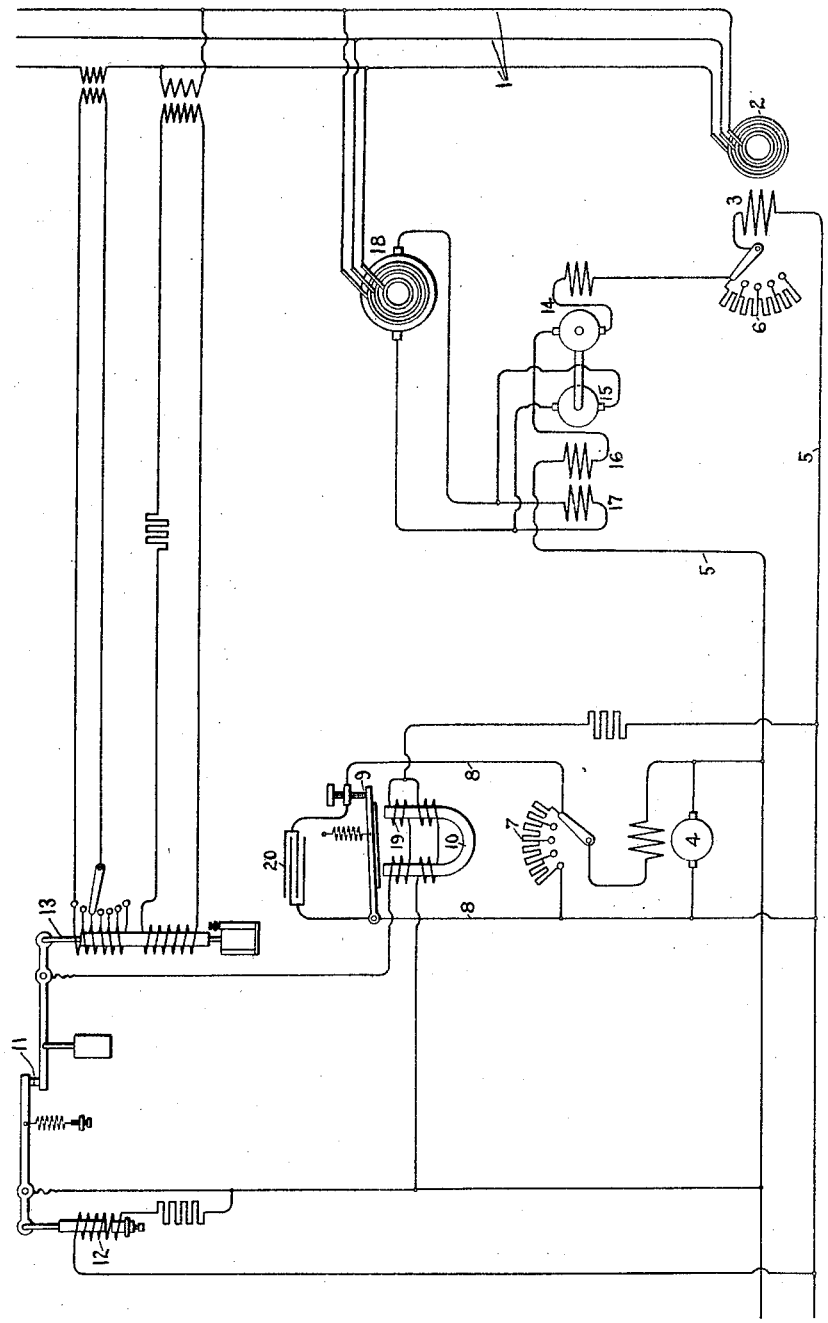
Witnesses:
Helen Orford
Benjamin B. Hull
Inventor
Ernst J. Berg,
by Albert G. Davis
Atty.

UNITED STATES PATENT OFFICE.

ERNST J. BERG, OF SCHENECTADY, NEW YORK, ASSIGNOR TO GENERAL ELECTRIC COMPANY, A CORPORATION OF NEW YORK.

VOLTAGE-REGULATOR.

No. 916,982.   Specification of Letters Patent.   Patented April 6, 1909.

Application filed May 12, 1908. Serial No. 432,399.

*To all whom it may concern:*

Be it known that I, ERNST J. BERG, a citizen of the United States, residing at Schenectady, county of Schenectady, State of New York, have invented certain new and useful Improvements in Voltage-Regulators, of which the following is a specification.

This invention relates to devices for regulating the voltage of currents in electrical supply systems, and it is especially designed for use in connection with the well-known Tirrill voltage regulator. Sometimes it happens to be desirable to vary the voltage in the exciter circuit of an alternating-current generator to a greater extent than the Tirrill regulator is capable of producing. The ordinary range of a Tirrill regulator is about one hundred per cent. But with some types of inductor-generators a range of two hundred or more per cent. is either advantageous or necessary.

The object of the present invention is to enable this result to be obtained, and to this end the invention consists in providing the exciter circuit, in addition to the Tirrill regulator, with an automatic booster set having a differentially-wound motor which drives the booster generator. By this means a much greater range of voltage can be secured in the field-circuit of the alternating-current generator, as hereinafter set forth.

The accompanying drawing is a diagram of circuits illustrating one embodiment of my invention.

The mains 1 are fed by an alternating-current generator, preferably of the three-phase inductor type, of which 2 is the armature. The field-winding 3 of this generator is energized by a direct-current exciter 4 through the conductors 5; the field strength of said generator being adjustable, to a certain extent, by a rheostat 6. The exciter 4 is provided with a voltage regulator, preferably of the Tirrill type; that is to say, the field strength of the exciter is regulated by a rheostat 7 which can be shunted by a circuit 8 containing the contacts 9. A condenser 20 bridges the contacts 9 so as to suppress the sparking. A differentially-wound relay 10 controls said contacts, and one winding 19 of said relay is in series with the floating contacts 11 which are opened and closed by the direct-current main control-magnet 12 and the alternating-current magnet 13, which has two windings energized directly or by transformers from the main line 1 in the usual well-known manner.

In one of the leads 5 carrying the exciter current to the alternating-current generator fielding-winding, I interpose a booster set, comprising a generator 14 driven by a motor 15, which has a field-winding 16 in the exciter circuit. A second field coil 17 is wound upon the coil 16, but in opposition thereto, and this differential winding is supplied with a direct current of constant potential from some suitable source, such, for instance, as a rotary converter 18 taking alternating-current from the mains 1, or, it may be connected to any separate source of supply of direct-current of constant potential. The armature of the motor 15 is in a shunt from the circuit of the field coil 17.

The operation of this invention is as follows: The excitation of the field of the motor 15 due to the coil 17 is constant; but that due to the coil 16 varies with the exciter-current, so that the effective excitation of the motor-field is not constant, but is a resultant of the effective ampere turns of the two opposing coils, and varies with the exciter-current, but in an inverse ratio. When the exciter-current is at its low value, the opposition set up by the coil 16 is low, and the coil 17 produces a strong field, driving the booster motor at a certain speed in accordance therewith. The current from the booster generator 14 is added to that derived from the exciter and the sum of the two is impressed upon the generator winding 3, being of a certain predetermined minimum value. But when by the continued and rapidly repeated closures of the relay contacts the exciter voltage rises to its high value, the increase of the exciter-current in the coil 16 cuts down the effective strength of the excitation due to the coil 17, and this weakening of the motor-field causes the motor to speed up proportionately, so that the excitation current is further increased. The result of this action is that the electro-motive force impressed upon the generator field winding 3 is much greater than would be the case if a simple Tirrill regulator were used. Thus, while the exciter voltage may range between 40 and 80, it is possible to give the field winding of the alternating-current generator a voltage ranging from 80 to 240 volts.

What I claim as new and desire to secure by Letters Patent of the United States, is:—

1. The combination with an alternating-current generator and a normal automatic voltage regulator therefor, of means for automatically increasing the amplitude of regulation by and in accordance with the normal regulation.

2. The combination with an alternating-current generator, an exciter therefor and a normal automatic voltage regulator for the generator, of a series booster generator in one of the leads between the exciter and the generator, and means for varying the speed of the booster by and in accordance with the normal regulation.

3. The combination with an alternating-current generator, an exciter therefor and an automatic voltage regulator for the generator, of a series booster in one of the leads between the exciter and the generator a differentially-wound motor for driving the booster, and means for energizing one of the motor windings from the exciter of the generator and the other from a source of constant potential.

In witness whereof, I have hereunto set my hand this 11th day of May, 1908.

ERNST J. BERG.

Witnesses:
 BENJAMIN B. HULL,
 HELEN ORFORD.